(12) United States Patent
Musselman et al.

(10) Patent No.: US 8,957,669 B2
(45) Date of Patent: Feb. 17, 2015

(54) MAGNET AND HOLDER ASSEMBLY HAVING IMPROVED ROTATIONAL AND AXIAL STABILITY

(76) Inventors: Stanley Byron Musselman, Noblesville, IN (US); Viswanathan Panchanathan, Anderson, IN (US); Mitchell L Spencer, Carmel, IN (US)

(*) Notice: Subject to any disclaimer, the term of this patent is extended or adjusted under 35 U.S.C. 154(b) by 484 days.

(21) Appl. No.: 13/099,091

(22) Filed: May 2, 2011

(65) Prior Publication Data

US 2011/0267039 A1 Nov. 3, 2011

Related U.S. Application Data

(60) Provisional application No. 61/330,394, filed on May 2, 2010.

(51) Int. Cl.
| | | |
|---|---|---|
| *G01P 3/54* | (2006.01) | |
| *G01B 7/30* | (2006.01) | |
| *G01B 3/48* | (2006.01) | |
| *H01F 7/02* | (2006.01) | |
| *G01P 1/02* | (2006.01) | |
| *G01P 3/487* | (2006.01) | |

(52) U.S. Cl.
CPC ............... *H01F 7/0221* (2013.01); *G01P 1/02* (2013.01); *G01P 3/487* (2013.01)
USPC ... 324/173; 324/207.25; 324/174; 324/207.2; 335/302

(58) Field of Classification Search
CPC ............ G01P 3/44; G01P 1/04; G01P 3/487; G01P 1/026
USPC .................... 324/173, 207.5, 207.2
See application file for complete search history.

(56) References Cited

U.S. PATENT DOCUMENTS

| | | | | |
|---|---|---|---|---|
| 3,876,927 | A * | 4/1975 | Gee et al. ........................ | 324/217 |
| 3,942,045 | A * | 3/1976 | Palazzetti ...................... | 310/155 |
| 4,256,986 | A * | 3/1981 | Anderson ...................... | 310/155 |
| 4,319,188 | A * | 3/1982 | Ito et al. ........................ | 324/173 |
| 5,504,424 | A * | 4/1996 | Graf et al. ..................... | 324/174 |
| 5,861,745 | A * | 1/1999 | Herden ....................... | 324/207.2 |
| 6,194,894 | B1 * | 2/2001 | Apel et al. ................. | 324/207.25 |
| 6,756,780 | B2 * | 6/2004 | Hagio et al. .............. | 324/207.25 |
| 6,819,102 | B2 * | 11/2004 | Hagio et al. .............. | 324/207.25 |
| 2004/0052671 | A1 * | 3/2004 | Okuda ............................... | 419/8 |
| 2004/0250631 | A1 * | 12/2004 | Pattok et al. ............. | 73/862.331 |

(Continued)

*Primary Examiner* — Jermele M Hollington
*Assistant Examiner* — Christopher McAndrew
(74) *Attorney, Agent, or Firm* — John D Ritchison; Ritchison Law Offices, PC

(57) ABSTRACT

A magnet held in a magnet holder is constrained against radial or axial instability, or against both, by a shape on either component in contact with complementary shape on the other component, the shaped components generally defining a tab-and-slot arrangement. The magnet component may be a bonded magnet and in one embodiment may be formed in place by injection molding. The magnet also will exhibit improved magnet properties when magnetized to have lines of polarity matching a path defined by the bulk of the magnetic material as governed by the location of tabs on the magnet. The invention is useful in magnet-sensor assemblies found in industrial applications and in automotive applications such as power steering systems.

15 Claims, 7 Drawing Sheets

(56) References Cited

U.S. PATENT DOCUMENTS

| | | | |
|---|---|---|---|
| 2006/0137474 A1* | 6/2006 | Nakane et al. | 73/862.331 |
| 2006/0158292 A1* | 7/2006 | Ugai et al. | 335/302 |
| 2006/0191601 A1* | 8/2006 | Komuro et al. | 148/302 |
| 2008/0048650 A1* | 2/2008 | Islam et al. | 324/207.2 |
| 2008/0249683 A1* | 10/2008 | Wu et al. | 701/41 |
| 2008/0297143 A1* | 12/2008 | Tanaka et al. | 324/173 |
| 2009/0027045 A1* | 1/2009 | Islam et al. | 324/207.13 |
| 2009/0085416 A1* | 4/2009 | Masuzawa et al. | 310/44 |

* cited by examiner

Section B-B

Section B-B

Section A-A

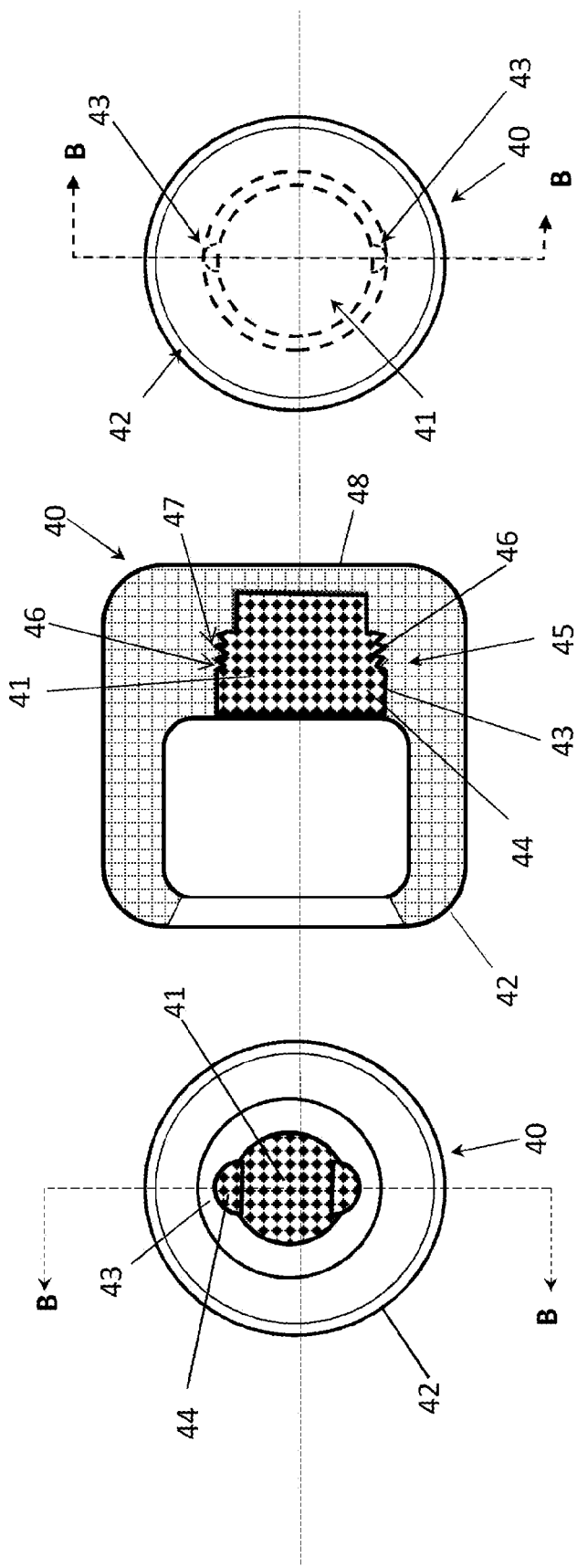

Section B-B

Section A-A

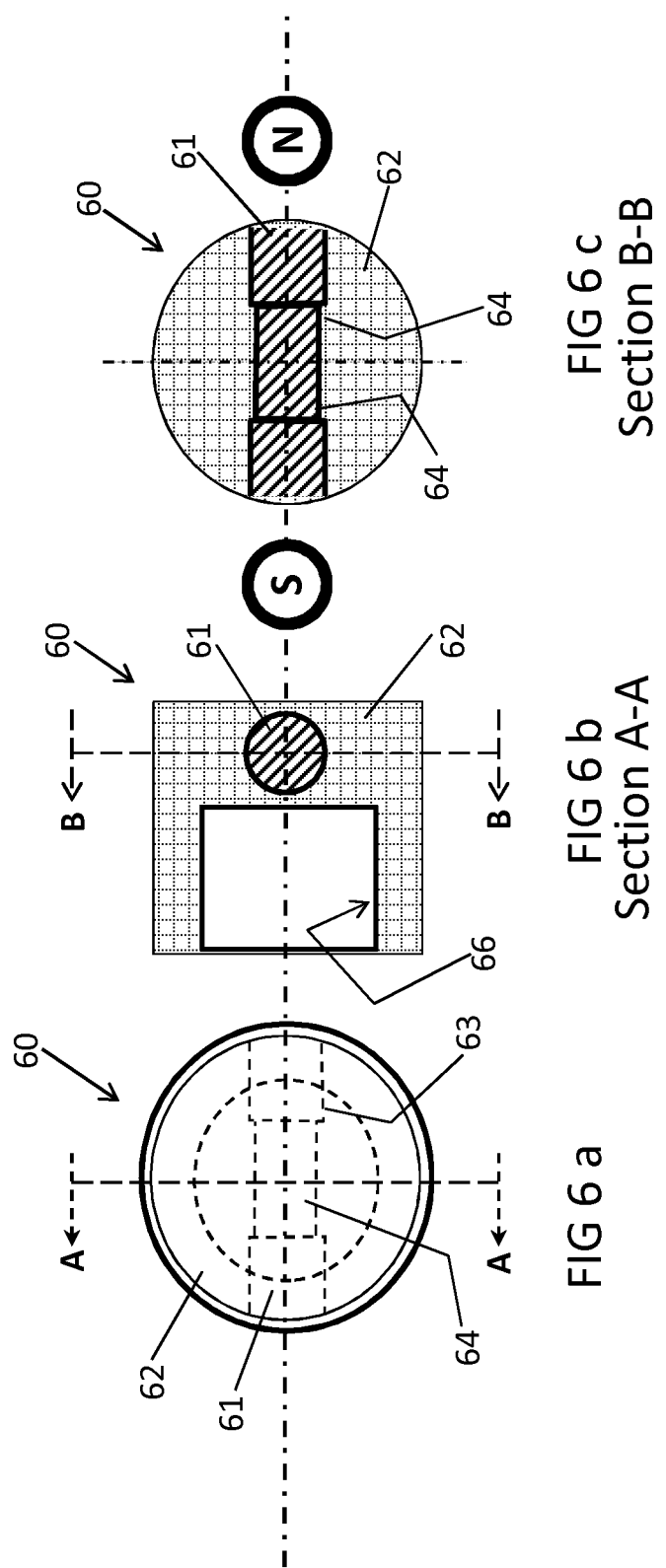

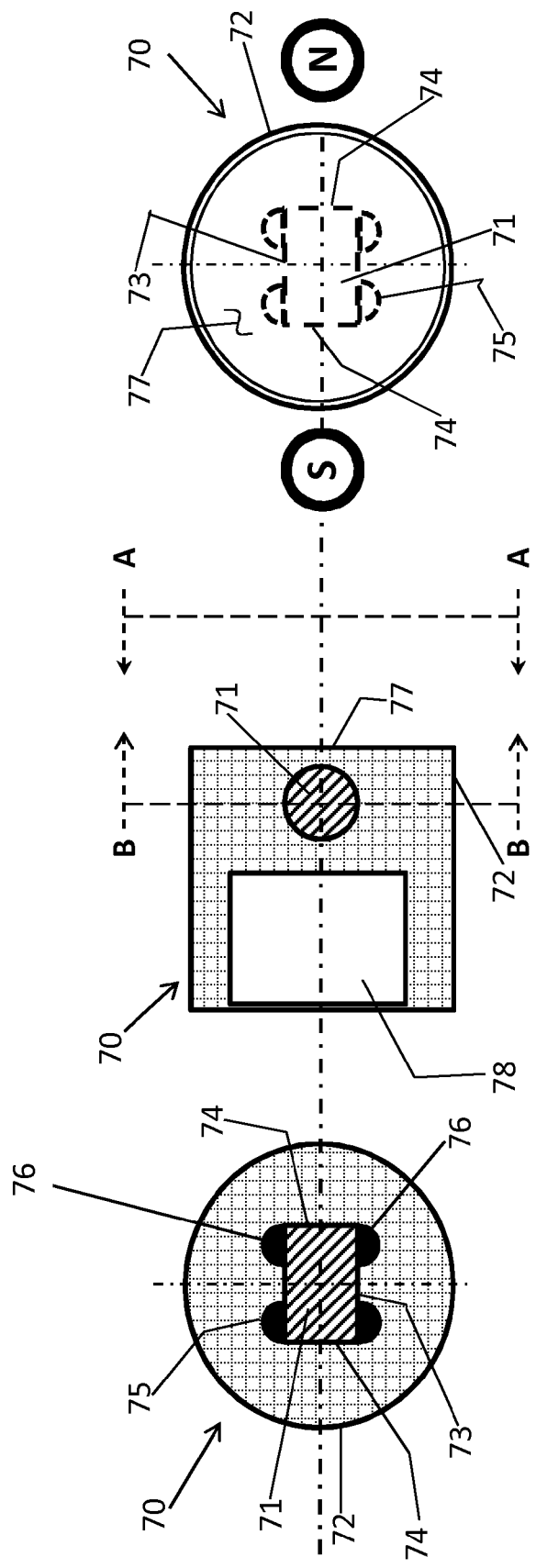

US 8,957,669 B2

MAGNET AND HOLDER ASSEMBLY HAVING IMPROVED ROTATIONAL AND AXIAL STABILITY

This application claims the benefit of U.S. Provisional Patent Application Ser. No. 61/330,394 filed May 2, 2010 by Stanley Byron Musselman et al and entitled "MAGNET AND HOLDER ASSEMBLY HAVING IMPROVED ROTATIONAL AND AXIAL STABILITY".

STATEMENT REGARDING FEDERALLY SPONSORED RESEARCH OR DEVELOPMENT

None.

REFERENCE TO SEQUENCE LISTING, A TABLE, OR A COMPUTER PROGRAM LISTING COMPACT DISC APPENDIX

None.

BACKGROUND OF THE INVENTION

1. Field of the Invention

This invention relates generally to magnets and magnet holders and, more specifically, to magnet and holder combinations having improved axial and rotational stability.

2. Background

Magnets have many uses in modern devices. Magnets are often used with sensors to detect the position of machine elements or to determine the speed, torque or direction of the movement of parts relative to each other. Such applications may be found in computers, printers and other electronic devices. Magnets also work with sensors in many automotive applications such as automatic brake systems. Magnet-sensor combinations also are an important part of smart remote actuators in automotive applications such as those that control air intake vents in turbochargers for diesel engines. Recently magnet-sensor combinations have been used extensively in electrically assisted power steering applications.

In most such applications the magnet is a bonded magnet that has been magnetized to have a pre-selected polarity. In many applications the magnet is supported and positioned during use by a magnet holder. In electronically assisted power steering applications, for example, such a magnet is retained by a holder on the end of a variable-speed motor shaft. The shaft spins the magnet-magnet holder assembly both clockwise and counter clockwise at speeds that can range up to 3,000 rpm or higher depending, for example, on the direction and speed the driver turns a vehicle's steering wheel. Sensors detect the steering wheel movement by detecting the speed and the direction of rotation of the magnet.

Rotational and axial stability of the magnet relative to the magnet holder is of great importance, especially when sensing of the magnet's rotation is used to control or to assist in steering an automobile. Sensing the speed and direction of a magnet's rotation typically involves sensing movement of the pre-determined polarity of the magnet as it rotates. Rotational slipping of the magnet in the magnet holder would cause the sensor to send incorrect information to a power assisted brake or to a steering mechanism. Likewise, axial movement of the magnet in the magnet holder, or axial separation of the magnet from the magnet holder, during operation would at least cause a sensor to send incorrect information to the controlled device and could prevent operation of the device.

There is a need for a magnet-holder assembly that provides improved axial and rotational stability of the magnet in the holder.

BRIEF SUMMARY OF THE INVENTION

It is an object of this invention to improve the axial and rotational stability of a magnet relative to a magnet holder in which the magnet is retained.

It also is an object of this invention to improve the safety and reliability of assemblies comprising a magnet and a holder.

These and other objects are accomplished by the present invention. In one aspect the present invention is a device comprising a shaped magnet, at least a portion of which is in contact with the shaped surface of a magnet holder. The shaped surface of the magnet holder is generally complementary to the portion of the shaped magnet with which it is in contact such that radial movement between the shaped magnet and the magnet holder is constrained. Additionally the shaped magnet and magnet holder may have complementary shapes that constrain axial movement between them.

The device may include an adhesive layer bonding at least a portion of the shaped magnet to the surface of the magnet holder whereby axial movement of the magnet and the magnet holder relative to each other is constrained.

The magnet holder component of the present invention may be made from any useful non-magnetic material. Aluminum is normally the non-magnet material of choice because of its strength, availability, workability and relative cost. Other useful materials include, for example, high strength plastics and non-magnetic composites, including composites containing carbon fibers.

A shaped magnet useful in the present invention may be made from a variety of magnetizable materials. Powdered magnetic materials are preferred because of the relative ease of forming powdered magnetic materials into desired shapes compared with other useful materials such as iron and iron-containing compounds. Magnets of various shapes may be formed from powdered magnetic material and may be isotropic or anisotropic in nature. Bonded magnets having pre-selected shapes are known. Their manufacture in shapes generally suitable for use as shaped magnets in the present invention also is known. Shaped magnets have been made by methods including sintering, extrusion, injection and compression molding of magnet powders. Shaped magnets useful in the present invention can be made by any such method; however, the making of such shaped magnets is illustrated here by a brief description of the compression molding method.

A compression molded magnet is one type of bonded magnet. Typically, compression molded magnets are made from powdered magnetic materials. Generally speaking, the powdered magnetic material will be a compound that comprises rare earths, transition metals and boron. Magnetic materials include ferrites, samarium-cobalt, aluminum-nickel-cobalt, and neodymium-iron-boron type materials either alone or in combination. In recent years neodymium-iron-boron has been used for many bonded magnet applications. Preferably the compounds will be made from Nd, Pr, Fe, Co and B. Industrial use of powders as a component in the manufacture of powdered metal magnets has centered around $Nd_2Fe_{14}B$ and its derivatives, such as $Dy_2Fe_{14}B$; $Dy_xNd_{2-x}Fe_{14}B$; $Pr_2Fe_{14}B$, and $Pr_xNd_{(2-x)}Fe_{14}B$. As is well known in the art, cobalt may be substituted for all or part of the iron in the neodymium-iron-boron phase of the magnet. Other metals such as niobium, titanium, zirconium, vanadium, tungsten etc can be added to neodymium-iron-boron alloys to obtain desired magnetic properties. Other rare earth metals, such as, but not limited to, cerium, dysprosium, erbium, praseodymium and yttrium may be substituted for all or part of the neodymium. Part or all of the boron may be replaced by carbon, silicon or phosphorous. Other metals or nonmetals may be substituted for small portions of either the iron or the neodymium, and the relative proportions of the neodymium, iron, and boron may be varied slightly. Usually, Nd—Fe—B material for use in such pre-formed magnets is obtained by the rapid solidification process. Other methods, such as using hydrogen, also can be used to make these magnetic materials.

The particle size of useful powdered materials varies widely depending on particular applications. Typically, powdered metals useful in making compression molded bonded magnets have an average particle size of about 150 microns, although particle sizes ranging from about 20 to about 400 microns may be useful. Magnetic metal particles useful in the present invention are commercially available from, for example, Neo Materials Technologies (Magnequench), Toronto, Ontario, Canada.

Such powders typically are mixed with curable resins to form B-stage powders that are at least partially coated with an uncured resin system. The resin system may be a phenol novolac resin and a diamine crosslinker or hardener as described in the co-pending, commonly assigned U.S. application Ser. No. 12/152,383 filed May 13, 2008. As taught in that application other hardener systems can be used with the phenol novolac resin depending on the application and the curing method. Illustrative examples of other useful hardeners for phenol novolac resins are amines, polyamides, anhydrides, phenolic resins, polymercaptans, isocyanates and dicyandiamides which are selected depending on the application and the curing method. The resin system also may be, for example, bisphenol A-epichlorohydrin or a bisphenol F-epichlorohydrin epoxy resin system for example. The resin system also can be a thermoplastic material.

B-stage powders normally are used to form powdered metal shapes by a well-known compression process in which high pressure is applied to a pre-measured charge of the powder held in a die cavity. The pressure applied typically is about 60 tons/square inch. The resulting shape, referred to at this point as a B-stage item, is then cured by heating at atmosphere to a temperature sufficient to initiate crosslinking. Typically the curing temperature is about 170 degrees C. and is maintained for less than an hour.

As is taught in the co-pending, commonly-assigned U.S. patent application Ser. No. 61/308,941, filed Feb. 27, 2010, a shaped magnet also can be made by injection molding or extruding techniques and, optionally, can be sintered prior to assembly with the magnet holder. When a shaped magnet is made using injection molding techniques, the magnet material typically is applied in a viscous, fluid state to a cavity having a shape complementary to the desired shape of the shaped magnet. Upon curing, the magnet material forms a shape defined by the shape of the cavity.

In one manufacturing method the injection molded shaped magnet is removed from the cavity mold and assembled with a magnet holder having a shape complementary to the shape of the magnet. In a preferred manufacturing method the shaped magnet is formed in place in a cavity in the magnet holder. The injected magnet material, when cured, adheres to the walls of the cavity, forms a magnetizable shape that is complementary to the shape of the cavity and is thus constrained from radial separation from the magnet holder.

The magnets used in the present invention, however formed, are magnetized to have a pre-determined polarity by well-known means such as, for example, by the use of a U-Series Impulse Magnetizer available from Magnet-Physik Dr. Steingroever GmbH, Cologne, Germany. In a preferred embodiment the polarity is selected to coincide generally with the longest dimension of a tab extending from the shaped magnet because that dimension will normally will include the most magnetizable material.

The magnet and magnet holder may have any complementary shapes that, when in contact in the assembled device, will resist rotational movement relative to each other when the assembly is subjected to repeated, rapid reciprocal rotation by, for example, torque applied to the magnet holder. Any complementary shapes that will accomplish such resistance to relative rotation or slippage between the magnet and the magnet holder are useful in the present invention. Typically the complementary shapes will include some variety of a tab extending from one of the components that is generally complementary in shape to a slot or groove on the other component. Such a combination of shapes is often described as a "tongue-and-groove" or a "key-and-slot" arrangement. In a typical arrangement the tab is a portion of the magnet that extends into a complementary groove, slot or recess in the surrounding magnet holder. Alternatively the tab, tongue or key may extend from the wall of the magnet holder into a slot, groove or recess in the magnet that is held in the magnet holder.

Optimally the magnet and magnet holder also will have complementary shapes that constrain relative axial movement between them during use. The complementary shapes that constrain relative axial movement between the components also will normally be some variety of key-and-slot or tongue-and-groove combination. In some embodiments the shapes that constrain axial separation of the magnet and magnet holder will include interlocking of grooves and ridges in the components. In other embodiments axial separation of the components is constrained by a shape or a pattern of shapes formed in the walls of the magnet holder and filled with a cured injection molded magnet material. In one such embodiment a screw thread shape is machined into the magnet holder. A curable magnet material is injected into the magnet holder and cured to form tabs that are complementary to the screw threads.

In yet another embodiment the end of the magnet holder that presents the magnet to a sensor is partially or completely covered by an end portion of the magnet holder. In such an embodiment the walls of a generally tubular magnet holder are narrowed or crimped at one end to prevent axial movement between the magnet holder and the contained magnet. Alternatively, the end of the magnet holder may be completely closed. A completely closed end also can facilitate manufacturing of the assembly when injection molding is used to form the magnetizable material in the magnet holder.

It will be clear to those of ordinary skill in the manufacturing arts that the most desirable complementary shapes in high volume production will be governed by the relative cost and speed of available manufacturing techniques.

Constraint against relative axial movement between the components of the present device also may be obtained or enhanced by an adhesive layer that bonds the magnet to the magnet holder. Ideally the adhesive layer, when present, is of uniform thickness and is present between all areas of contact between the components. However, uniform coverage is not a requirement for the adhesive layer to be effective in constraining relative axial movement between the magnet and the magnet holder over long periods in high frequency reciprocal applications at elevated temperatures. The ambient temperature range at which the device of the present invention is expected to operate can affect the glass transition temperature (Tg) of a cured adhesive, its tensile strength throughout the range of typical operating temperatures, its hardness properties and its thermal shock resistance. Any adhesive material that provides the desired constraint may be used. Typically, the adhesive is a chemically or thermally curable resin. The selection of a particular adhesive material or system also can depend on the specific magnet and magnet holder materials.

Many adhesives resins may be used to constrain relative axial movement between the magnet and the magnet holder in the device of the present invention. Useful resins include, for example, phenol novolac resins, Bisphenol A modified phenol novolac epoxy resins, Bis A epoxy resins, hydrogenated Bis A epoxy resins, Bis F epoxy resins and dimmer acid modified epoxys. These resins can be used in combination with a variety of hardeners including diamine, dicyandiamide, polyamide, dodecenyl succinic anhydride, NMA, HHPA, TETA and MeHHPA. Other adhesive systems such as polyurethane and acrylic also can be used to form a cured adhesive layer between the magnet and the magnet holder.

BRIEF DESCRIPTION OF THE SEVERAL VIEWS OF THE DRAWINGS

FIG. 1a shows a plan view of a magnet and magnet holder assembly of the prior art.

FIG. 1b shows in schematic perspective view a magnet of the prior art.

FIG. 1c shows in cross section along line A-A of FIG. 1a an elevation of the prior art device of FIG. 1a.

FIG. 2a shows in plan view a device according to the present invention.

FIG. 2b shows in schematic perspective a magnet useful in the present invention having a tab extending from a surface opposite its face.

FIG. 2c shows in cross section along line B-B of FIG. 2a an elevation of the assembly of FIG. 2a.

FIG. 3b is a cross sectional view of the device of the present invention along line A-A of FIG. 3a.

FIG. 3c is a cross sectional view of the device of the present invention along line B-B of FIG. 3a.

FIGS. 4a and 4b show a top and bottom view, respectively of a device according to the present invention in which the magnet holder covers the injection molded magnet.

FIG. 4c shows a cross sectional view of the device of FIGS. 4a and 4b.

FIG. 5a shows a plan view of the device of the present invention in which an adhesive layer adds axial stability to the device of the present invention.

FIG. 5b is a cross sectional view of the assembly of the present invention along line A-A of FIG. 5a.

FIG. 5c is a cross sectional view of the assembly of the present invention along line B-B of FIG. 5a.

FIGS. 6a, 6b and 6c show a magnet and magnet holder assembly according to the present invention in which an injection molded magnet is restrained from both axial and radial movement relative to the magnet holder by the complementary shapes of magnet and magnet holder.

FIGS. 7a, 7b and 7c show a magnet and magnet holder assembly according to the present invention in which a sintered or bonded magnet is restrained from both axial and radial movement relative to the magnet holder by the complementary shapes of the magnet and magnet holder with the assistance of a potting adhesive.

DETAILED DESCRIPTION OF THE INVENTION

Figure 1:
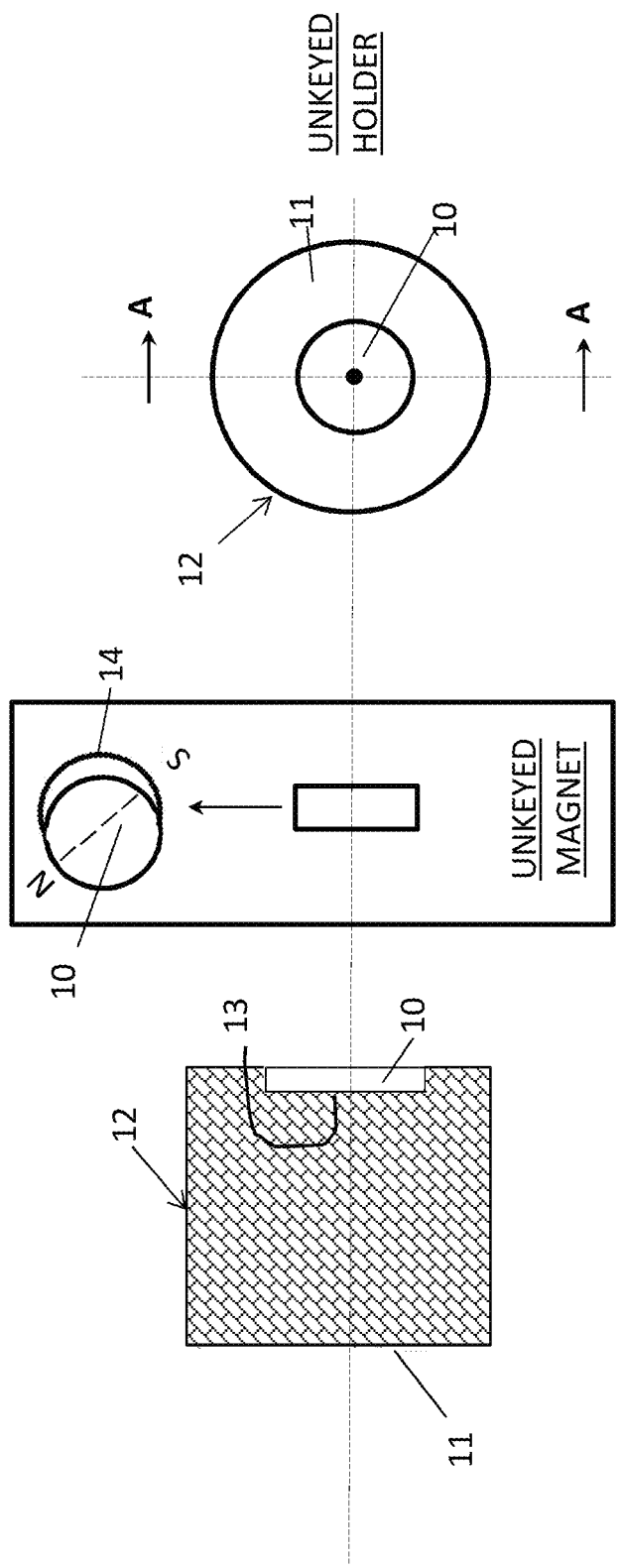

The call-out numbers used in the following detailed description are listed below for ease of reference:

| | |
|---|---|
| 10 | Prior Art Magnet |
| 11 | Prior Art Magnet Holder |
| 12 | Magnet Assembly |
| 13 | Smooth-sided Depression |
| 14 | Side of Magnet 10 |
| 20 | Magnet Assembly |
| 21 | Shaped Magnet |
| 22 | Tab |
| 23 | Magnet Holder |
| 24 | Slot |
| 25 | Magnet Face |
| 26 | Registration Flats |
| 30 | Device |
| 31 | Injection Molded Shaped Magnet |
| 32 | Magnet Holder |
| 33 | Slot |
| 34 | Tab Portion |
| 35 | Mounting Shape |
| 40 | Assembly |
| 41 | Injection Molded Magnet |
| 42 | Magnet Holder |
| 43 | Slots |
| 44 | Radial Locking Tabs |
| 45 | Axial Locking Threads |
| 46 | Grooves |
| 47 | Tongues |
| 48 | End Portion |
| 50 | Device |
| 51 | Magnet |
| 52 | Magnet Holder |
| 53 | Tab |
| 54 | Slot |
| 55 | Adhesive Layer |
| 60 | Assembly |
| 61 | Magnet |
| 62 | Magnet Holder |
| 63 | shaped space |
| 64 | Waist Portion |
| 65 | Flange Area |
| 66 | Shaped Void |
| 70 | Device |
| 71 | Magnet |
| 72 | Magnet Holder |
| 73 | Shaped Portion |
| 74 | Shaped Portion |
| 75 | Shaped Void |
| 76 | Adhesive Potting Compound |
| 77 | End Portion |
| 78 | Shaped Void |

Magnet 10 and magnet holder 11 of the prior art are shown in FIG. 1a. When assembled as shown in FIG. 1a these components form a prior art magnet assembly generally designated 12. FIG. 1b shows prior art magnet 10 in schematic perspective view. Magnet 10 is seen to be a smooth, truncated cylinder that is held in an equally smooth-sided depression 13 in magnet holder 11. Such prior art assemblies are used in magnet-sensor combinations such as those found in electrically assisted steering systems in vehicles. In such an application, magnet assembly 12 typically is placed on the shaft of a motor that spins clockwise and counter clockwise at speeds up to 3,000 RPM depending on the direction in which a vehicle's steering wheel is turned and on the speed at which it is turned.

The smooth, curved side 14 of prior art magnet 10 and the equally smooth sides of depression 13 contain no structures that might constrain radial movement between magnet 10 and magnet holder 11 during rapid, high speed reciprocation. Magnet 10 normally will be magnetized across its face as exemplified by the N-S line shown in FIG. 1b so that the direction and speed of movement of the lines of flux resulting from the polarity of magnet 10 can be registered by a nearby sensor (not shown). Radial slippage of magnet 10 in depression 13 during rotation of assembly 12 will result in inaccurate readings of the speed and direction of movement of magnet 10, as described above.

The magnet assembly generally designated 20 in FIGS. 2a and 2c is made according to the present invention and resists radial slippage between shaped magnet 21 and magnet holder 23 during high speed reciprocal rotation of magnet assembly 20. Magnet 21 is shaped to include tab 22 extending from the flat surface of magnet 21 opposite magnet face 25. Magnet holder 23 includes slot 24 that is complementary to tab portion 22 of shaped magnet 21. When tab 22 is positioned in slot 24 as shown in FIGS. 2a and 2c, the complementary shapes resist radial slippage relative to each other as assembly 20 spins at high speeds with sudden reversals of direction.

Registration flats 26 shown in FIGS. 2a and 2c are used to align assembly 20 in a magnetizer when, after assembly, it is magnetized to have a pre-determined polarity. In preferred embodiments the polarity is of the magnet is aligned as much as possible with the length of a tab, such as tab 22, so that a large amount of magnetizable material lies in a plane substantially parallel with the lines of polarity, resulting in gauss variability as shown in Example 2.

Figure 3A:
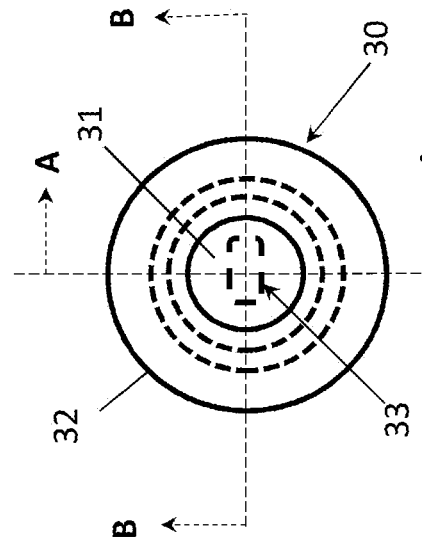
FIG. 3a shows a plan view of an embodiment of the present invention in which relative axial movement between the magnet and the magnet holder also is constrained.
Figure 3C:
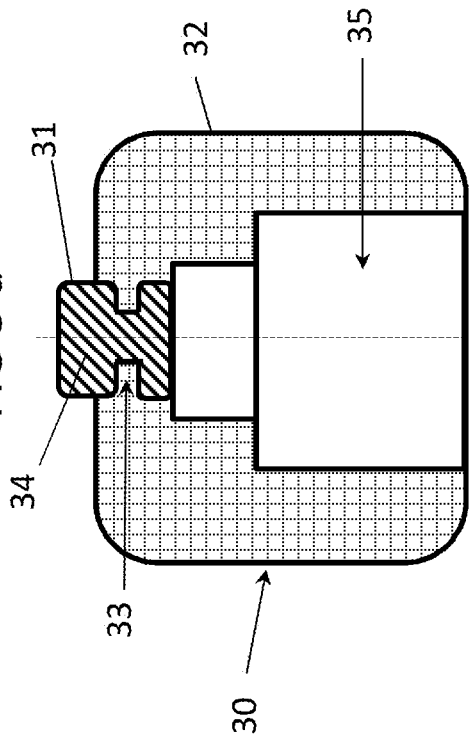
Figure 3B:
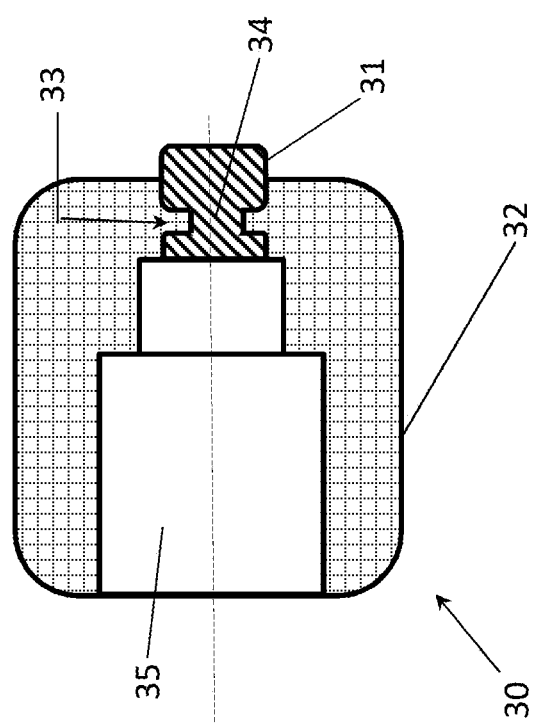

FIGS. 3a, 3b and 3c show a device 30 according to the present invention that is adapted also to provide axial stability. Device 30 includes an injection molded shaped magnet 31 assembled with shaped magnet holder 32. During one exemplary manufacturing process, shaped magnet holder 32 is first formed as a closed end cup-like structure after which an oblong slot 33 is formed through the closed end. Slot 33 can be made by drilling overlapping holes through the closed end of holder 32.

As is best seen in FIGS. 3a and 3c, slot 33 is longer on axis A-A than on axis B-B. Magnetic material is injected into holder 32 so that it fills slot 33 and is cured to form shaped magnet 31. Shaped magnet 31 includes tab portion 34 that is complementary in shape to slot 33. Tab portion 34 of shaped magnet 31 works with slot 33 to constrain relative radial movement between the components when device 30 is rotated at high speeds in reciprocal mode.

This embodiment of the present invention includes a mounting shape 35 at the end of assembly 30 that is illustrative of a variety of configurations that are useful in mounting assembly 30 on, for example, a motor shaft in industrial and automotive applications.

Another embodiment of a magnet assembly according the present invention that is constrained against both radial and axial slippage is shown in FIGS. 4a, 4b and 4c. The assembly, generally designated 40, includes shaped magnet material 41 that has been injection molded and cured to form a shape complementary to the shape of the interior of magnet holder 42. The interior of magnet holder 42 has been shaped by, for example, overlapping drilling to include slots 43 that are best seen in FIGS. 4a and 4c. The injection molded magnet material fills slots 43 and, when cured forms tabs 44 that are complementary in shape to the shape of slots 43. Tabs 44 and slots 43 work together to constrain relative radial movement between magnet 41 and magnet holder 42 during high speed reciprocal rotation of assembly 40.

The interior of magnet holder 42 also includes machined threads 45. During injection molding, magnet material fills the depressions, or grooves 46, that are a part of the thread structure. Upon curing, the material filling the grooves 46 between threads 45 forms complementary tabs or tongues 47 that work with grooves 46 to constrain axial relative movement between magnet 41 and magnet holder 42 during high speed reciprocal rotation of assembly 40.

Grooves 46 are formed in the embodiment of FIGS. 4a, 4b and 4c by producing threads on the inner surface of the magnet holder. Threads were chosen because the technology for producing threads on the interior of cylindrical surfaces already is well established. Other shapes will be useful in practicing the present invention. For example grooves such as those intended to hold O-rings also are useful. A plurality of methods for creating slots on the inner surface of the magnet holder will be apparent to those of ordinary technical skill, and such slots are intended to be within the scope of the appended claims. Axial instability also can be constrained by tapering the interior of magnet holder 42 so that the injection molded magnet material forms a truncated cone with its wide end in contact with end portion 48, causing the complementary shapes of magnet 41 and magnet holder 42 to resist relative movement.

The face of assembly 40 that holds the rotating magnet 41 functionally close to a sensor (not shown) is covered by a relatively thin end portion 48 of magnet holder 42. This optional configuration facilitates control of the magnetic slurry during the injection molding process and may protect the surface of magnet 41 against environmental damage during use in some applications.

Figure 5:
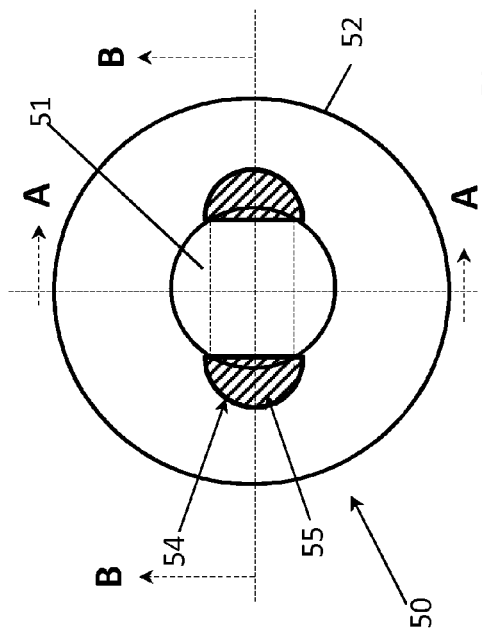
Figure 5:
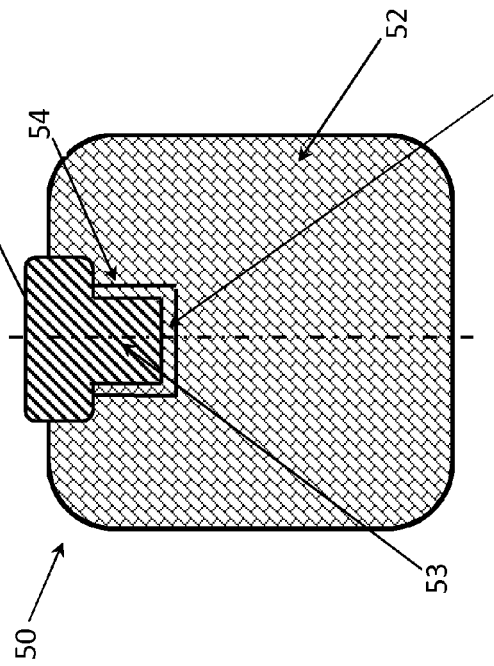
Figure 5:
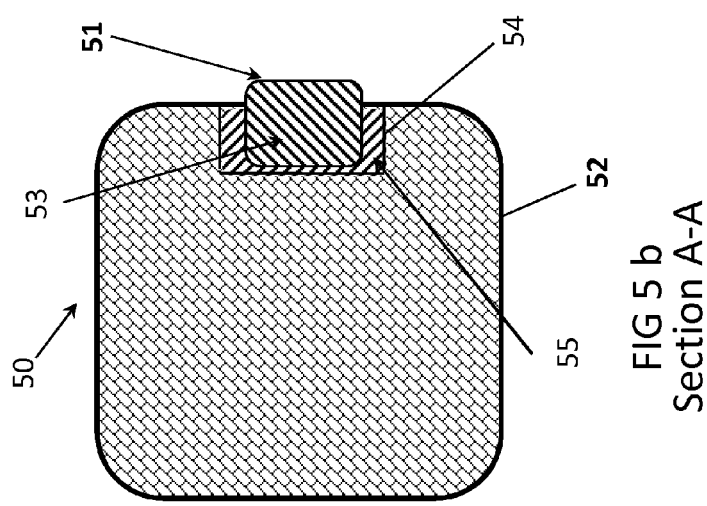

FIGS. 5a, 5b and 5c show a device according to the present invention, generally designated as 50, in which constraint against radial instability between magnet 51 and magnet holder 52 is provided by tab 53 and complementary slot 54 as illustrated in FIGS. 2a, 2b and 2c, above. In the embodiment of FIGS. 5a, 5b and 5c, however, constraint against axial instability is provided by adhesive layer 55 that bonds magnet 51 to magnet holder 52. As described in greater detail above, layer 55 typically is a thermally or chemically curable adhesive.

FIGS. 6a, 6b and 6c show another embodiment the present invention in which assembly 60 is constrained against both radial and axial relative movement between magnet 61 and magnet holder 62. Magnet holder 62 includes shaped space 63, illustrated in FIG. 6a by dashed lines, which is a generally cylindrical void having a narrowed waist portion 64. Magnet 61 is injection molded so as to fill shaped space 63 such that the complementary shapes of magnet 61 and magnet holder 62 in flange areas 65, which generally define the ends of waist portion 64, prevent lateral movement between injection molded magnet 61 and magnet holder 62.

As is best seen in FIG. 6b, the complementary cross sectional shapes of magnet holder 62 and injection molded magnet 61, both of which are generally circular in this embodiment, also constrain relative axial movement between them. Shaped void 66, shown in FIG. 6b, enables mounting of assembly 60 on, for example, the shaft of an electric motor (not shown) for high speed reciprocation during use.

FIGS. 7a, 7b and 7c show an embodiment of the present invention in which device 70 includes magnet 71 held in magnet holder 72. Relative movement between magnet 71 and holder 72 is constrained by the complementary shapes of sintered or bonded magnet 71 and shaped portions 73 and 74 of shaped void 75 acting in combination with adhesive potting compound 76, which fills portions of shaped void 75 not occupied by magnet 71. End portion 77 of magnet holder 72 covers magnet 71, preventing exposure to harsh elements during operation. Shaped void 78, shown in FIG. 7b, enables mounting of device 70 on, for example, the shaft of an electric motor (not shown) for high speed reciprocation during use.

EXAMPLE 1

Figure 2:
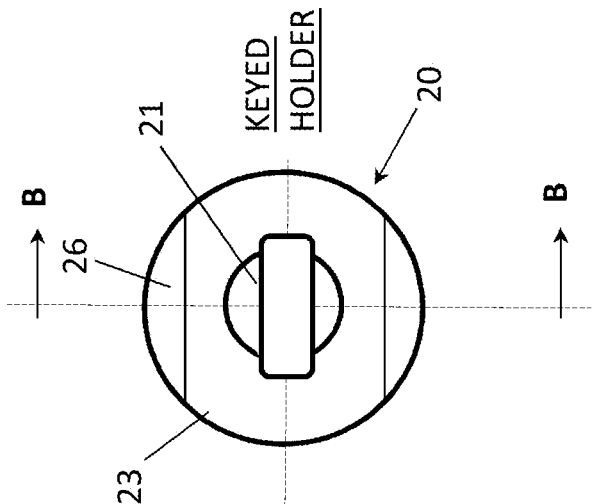
Figure 2:
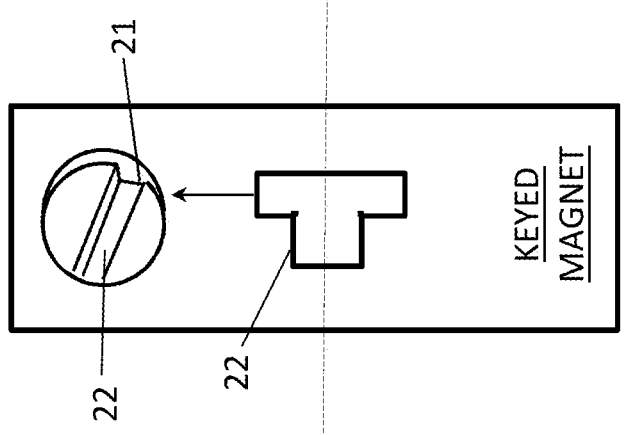
Figure 2:
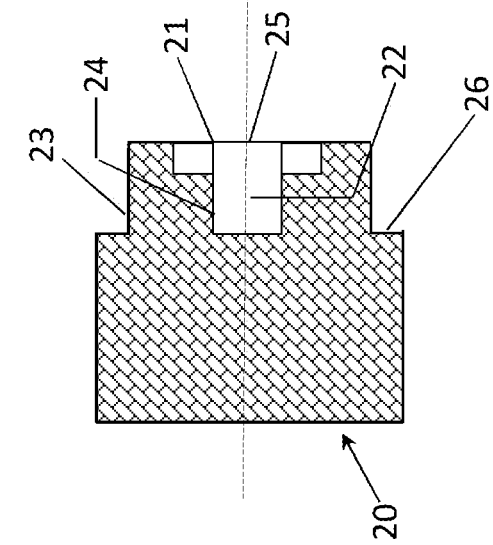

A prior art magnet and magnet holder assembly as shown in FIG. 1 was made using a sintered NdFeB magnet and an aluminum magnet holder. The assembly was tested for torque to failure. The assembly failed at force of 1 Nm. For comparison, a magnet and magnet holder assembly as shown in FIG. 2 was made using the same materials and tested for torque to failure. The assembly of FIG. 2 failed at 4.3 Nm, indicating that the construction according to the present invention can withstand much higher torque than the assembly of the prior art and resists radial slippage to a greater degree.

EXAMPLE 2

A prior art assembly was made according to FIG. 1 using a sintered ferrite magnet. The magnet was magnetized across its diameter. The gauss value of the magnet was measured at a height of 10 mm above the magnet surface in the Z plane. The gauss value varied within +/−5.0%.

A similar design was made using the tabbed magnet as shown in FIG. 2 and was magnetized with polarity lines parallel to the tab. The gauss value was measured in the Z plane as with the assembly of FIG. 1. The variation was +/−2%, indicating the tabbed design provides improved magnetic properties.

With the above description it is to be understood that the MAGNET AND HOLDER ASSEMBLY HAVING IMPROVED ROTATIONAL AND AXIAL STABILITY is not to be limited to only the disclosed embodiment. The features of the MAGNET AND HOLDER ASSEMBLY HAVING IMPROVED ROTATIONAL AND AXIAL STABILITY are intended to cover various modifications and equivalent arrangements included within the spirit and scope of the description.

The invention claimed is:

1. A magnet/magnet-holder assembly having improved relative stability during high speed rotation, the assembly comprising:
   a. a non-magnetic magnet holder comprising an interior cavity with at least one shaped wall;
   b. a shaped magnet positioned in the interior cavity, the magnet having a shape substantially complementary to that of the interior cavity;
   c. the interior cavity comprised further of an axial constraint; and
   d. an adhesive layer between the magnet and the magnet holder such that contact between the shaped magnet, the at least one shaped wall and the axial constraint of the interior cavity constrains relative axial movement and relative radial movement between the magnet and magnet holder.

2. The assembly of claim 1 wherein one of the shaped magnet comprises at least one tab-shaped portion complementary to and in contact with at least one corresponding recess in the other one of the magnet or the cavity wall and the axial constraint comprising a groove.

3. The assembly of claim 1 wherein the shaped magnet comprises at least one tab-shaped portion complementary to and in contact with at least one corresponding recess in the other one of the magnet or the cavity wall and the axial constraint comprising a thread shape.

4. The assembly of claim 1 wherein the shaped walls of the cavity is comprised from the group consisting of a plastic material, aluminum, and a non-magnetic composite material and wherein the magnet holder substantially covers and protects the shaped magnet.

5. The assembly of claim 1 wherein the shaped magnet is magnetized to have predetermined lines of polarity and is oriented during magnetization such that the resulting lines of polarity correspond generally to the location of the greatest amount of magnetizable material in the shaped magnet.

6. The assembly of claim 1 wherein the optional adhesive layer, if present, comprises a curable resin adhesive.

7. The assembly of claim 5 wherein the shaped magnet has a substantially columnar shape with a flat, round face and comprises a tab extending substantially from the magnet diameter on the side opposite the magnet face, the magnet having pre-determined polarity substantially parallel to the diameter defined by the tab, and the non-magnetic magnet holder comprising a recess shaped to receive and to be in contact with the tab.

8. The assembly of claim 5 wherein the magnet or the magnet holder comprises at least one orientation index for use in orienting the magnet during magnetization.

9. A magnet-sensor device comprising:
   A magnet/magnet-holder assembly having improved relative stability during high speed rotation, the assembly comprising:
   a. a non-magnetic magnet holder comprising an interior cavity with at least one shaped wall and an axial constraint;
   b. a shaped magnet positioned in the cavity, the magnet having a shape substantially complementary to that of the cavity and is magnetized to have predetermined lines of polarity and is oriented during magnetization such that the resulting lines of polarity correspond generally to the location of the greatest amount of magnetizable material in the shaped magnet;
   c. an adhesive layer between the magnet and the magnet holder;
   d. the device is mounted on a shaft so that the pre-determined polarity is generally aligned with the diameter of the shaft end, the shaft being adapted to rotate in a direction and at a speed determined by a controller;
   e. the device has an electronic sensor positioned so as to sense the direction and speed of the rotation of the magnetic flux of the device, the sensor being adapted to provide data responsive to the sensed direction and speed of rotation;
   f. a non-magnetic magnet holder comprising a cavity with at least one shaped wall;
   g. a shaped magnet positioned in the cavity, the magnet having a shape substantially complementary to that of the cavity, the magnet being magnetized to have pre-determined lines of polarity; and the magnet being substantially covered by the magnet holder; and
   h. an adhesive layer between at least a portion of the shaped magnet and the cavity such that contact between the shaped magnet and the at least one shaped wall of the cavity constrains relative axial movement, relative radial movement or both between the magnet and magnet holder.

10. The assembly of claim 1 wherein one of the shaped cavity wall comprises at least one tab-shaped portion complementary to and in contact with at least one corresponding recess in the other one of the magnet or the cavity wall and the axial constraint comprising a groove.

11. The assembly of claim 1 wherein the shaped cavity wall comprises at least one tab-shaped portion complementary to and in contact with at least one corresponding recess in the other one of the magnet or the cavity wall and the axial constraint comprising a thread shape.

12. The assembly of claim 1 wherein the shaped magnet comprises at least one tab-shaped portion complementary to and in contact with at least one corresponding recess in the other one of the magnet or the cavity wall and the axial constraint comprising a groove and a thread shape.

13. The assembly of claim 1 wherein the shaped cavity wall comprises at least one tab-shaped portion complementary to and in contact with at least one corresponding recess in the other one of the magnet or the cavity wall and the axial constraint comprising a groove and a thread shape.

14. The assembly of claim 1 wherein the shaped magnet is comprised from the group consisting of an isotropic bonded magnet, an anisotropic bonded magnet, an isotropic sintered magnet, and an anisotropic sintered magnet.

15. The assembly of claim 14 wherein the shaped walls of the cavity comprise at least one opening suitable for injecting a flowable magnetic material to form a shaped magnet.

* * * * *